Aug. 29, 1967

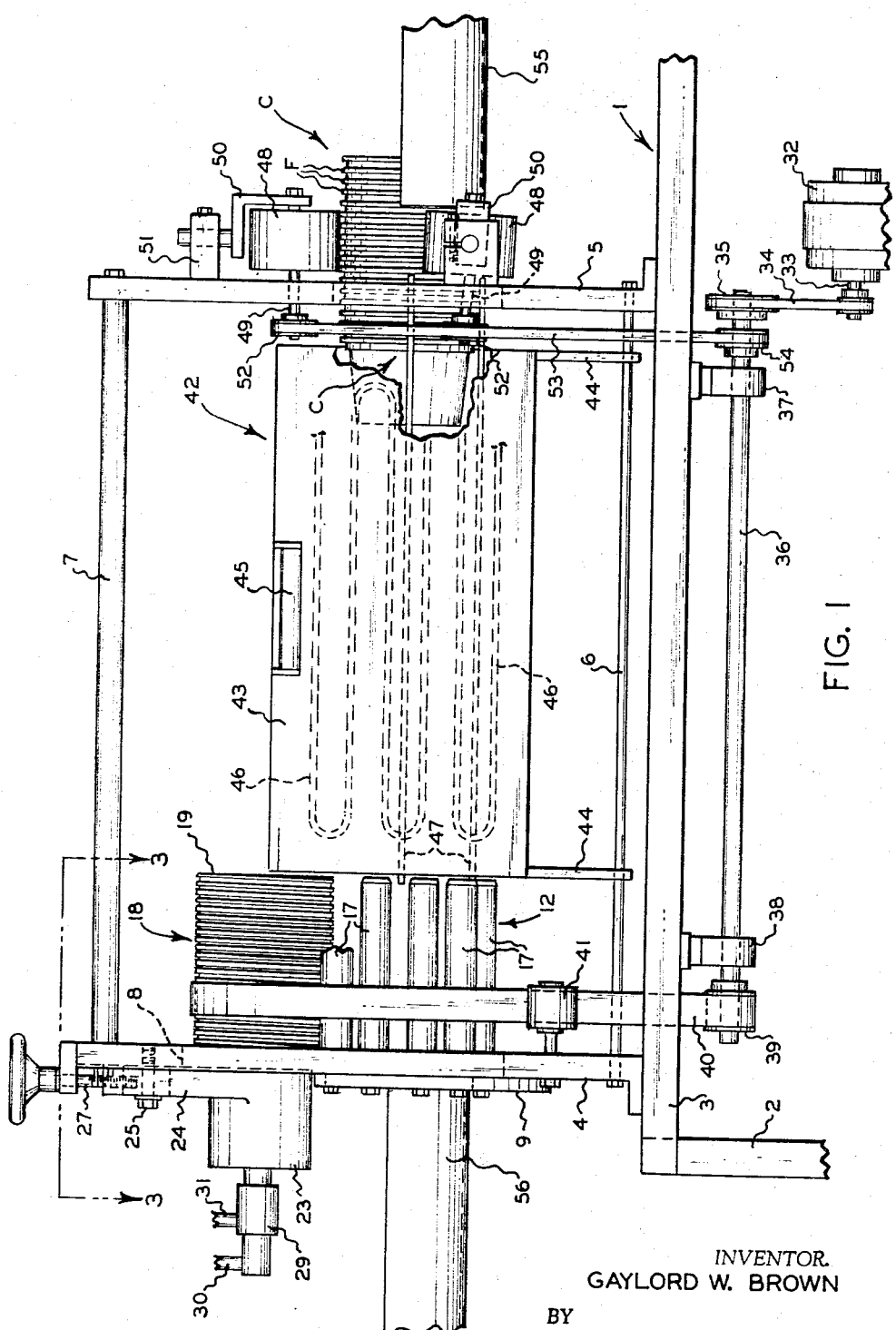

G. W. BROWN 3,337,919

CONTAINER RIM BEADING APPARATUS

Filed March 31, 1966

INVENTOR.
GAYLORD W. BROWN

BY

*Learman + McCulloch*

ATTORNEYS

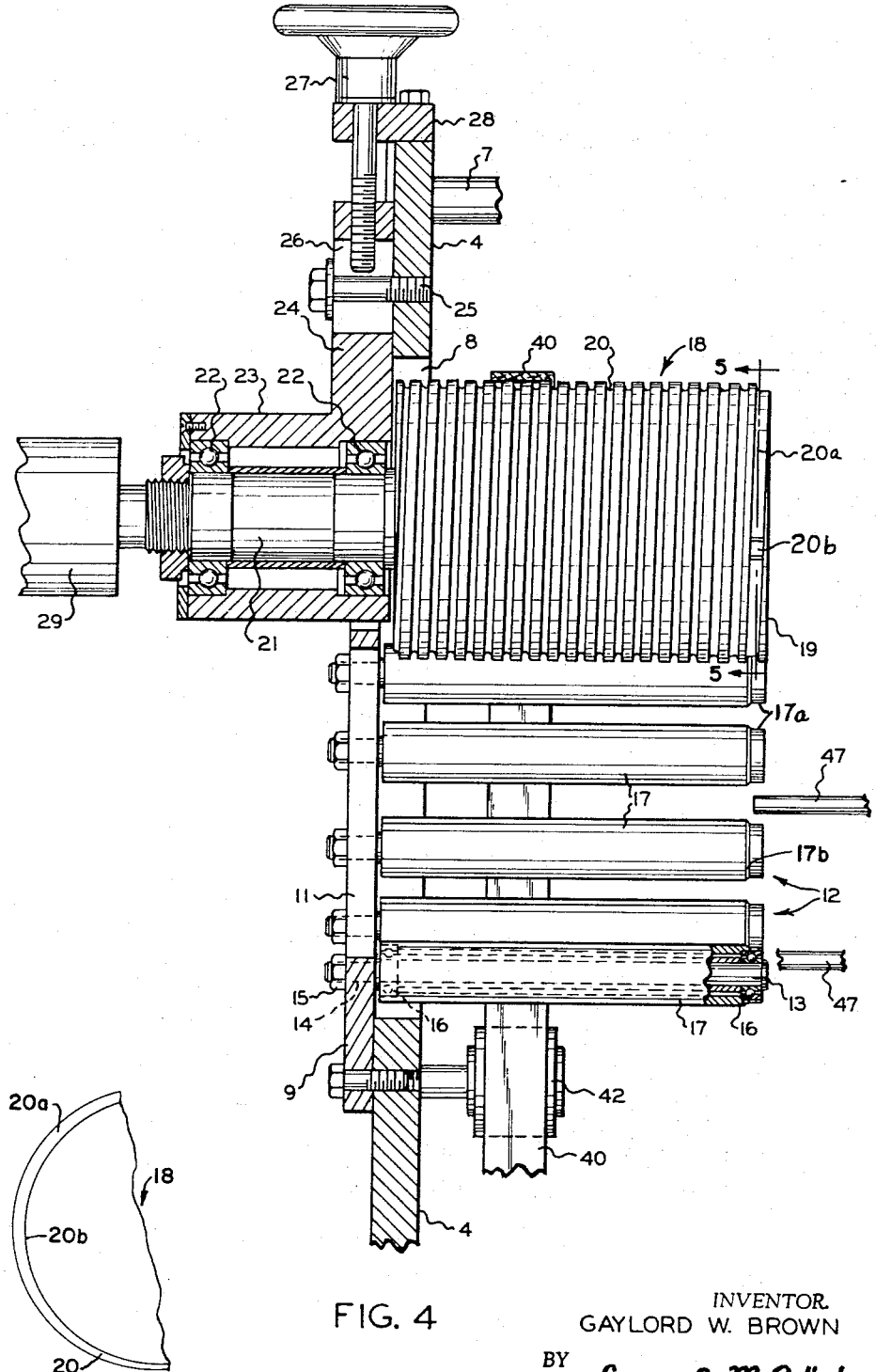

United States Patent Office 3,337,919
Patented Aug. 29, 1967

3,337,919
CONTAINER RIM BEADING APPARATUS
Gaylord W. Brown, Beaverton, Mich., assignor to Brown Machine Company of Michigan, Inc., a corporation of Michigan
Filed Mar. 31, 1966, Ser. No. 543,478
12 Claims. (Cl. 18—19)

ABSTRACT OF THE DISCLOSURE

Apparatus for curling the rims or flanges of plastic containers which are arranged in stacked relation comprising: a plurality of circumferentially spaced forming members, one of said forming members comprising a driven rotatable roll having a rim curling spiral groove adapted to accommodate therein the rims or flanges of the container, and the other forming members comprising generally smooth surfaced crowding members maintaining the flange or rim in the groove under such force as to effect conjoint rotation and relative axial movement of said container and said groove-forming member; and means for heating the rim or flange to a deformable state.

---

This application is a continuation in part of application Ser. No. 510,783, filed Dec. 1, 1965, now abandoned, and relates to the beading of the rims of containers formed of thermoplastic plastic materials and the like and more particularly to the curling or rolling of a flange at the open end of a cup-shaped container.

It is conventional practice in the manufacture of polystyrene, polyethylene and other plastic containers such as disposable cups, cottage cheese bowls and the like to form multiple containers in a sheet of plastic material, cut out the molded containers from the plastic web, and then roll or curl the flange at the open end of each container to form a smoothly rounded bead. Heretofore it has been the practice to stack a plurality of such containers in nested relation, heat the flanges thereof to a deformable state, and introduce them axially between a plurality of axially disposed forming rolls provided with helical forming grooves in which the flanges of the containers are received. The forming members of such apparatus are rotated so as to cause the containers to move axially thereof and during the course of such movement of the containers the flanges are rolled or beaded by the grooves in the respective forming members. Apparatus of the general class referred to is disclosed in copending application Ser. No. 366,389, filed May 11, 1964 by Gaylord W. Brown and Donald J. Rise, to which reference may be had for a more detailed disclosure of the construction and operation of such apparatus.

In the operation of machinery utilizing multiple, helically grooved forming rolls, considerable care must be exercised in the initial positioning of the forming members relative to each other. For example, the grooves of the respective forming members must be so oriented with respect to each other that the rim or flange to be rolled is properly presented to the grooves in each forming member and in such position as to avoid cutting and scuffing of the rim and to avoid cocking or canting of the container during its passage through the rim rolling station. The requisite precise adjustment of each forming member relative to the others can become a complicated and time consuming operation.

Lip curling machinery of the class referred to frequently is utilized with containers formed of different materials and with containers produced on different molding machinery. As a consequence, one batch of containers may be sufficiently different from another batch that the curling apparatus must be adjusted between successive batches. Moreover, not all of the supposedly similar containers of successive batches are formed to the same tolerances. In those instances where the allowable tolerance of one batch of containers differs from the allowable tolerance of another batch, the curling apparatus must be adjusted to compensate for the tolerance difference.

An object of this invention is to provide apparatus for curling or beading a deformable plastic container rim which overcomes certain disadvantages of apparatus heretofore utilized.

Another object of the invention is to provide apparatus for beading the rim of a container by the utilization of a single, helically grooved rim forming or curling member, thereby avoiding the complications and complexities arising out of the use of multiple, grooved forming members.

A further object of the invention is to provide lip curling or beading apparatus of the character described which is capable of accommodating containers of relatively high tolerance differences.

Another object of the invention is to provide lip rolling apparatus of the kind described wherein adjustment of the apparatus, when required, may be effected quickly and easily.

A further object of the invention is to provide apparatus for beading the rim of a plastic or the like container which is less expensive than the apparatus utilized heretofore for similar purposes.

Other objects and advantages of the invention will be pointed out specifically or will become apparent from the following description when it is considered in conjunction with the appended claims and the accompanying drawings, in which:

FIGURE 1 is a fragmentary, side elevational view of apparatus constructed in accordance with the invention;

FIGURE 4 is an enlarged, sectional view taken on the line 4—4 of FIGURE 2; and

FIGURE 5 is a fragmentary, transverse sectional view taken on the line 5—5 of FIGURE 4.

Figure 3:
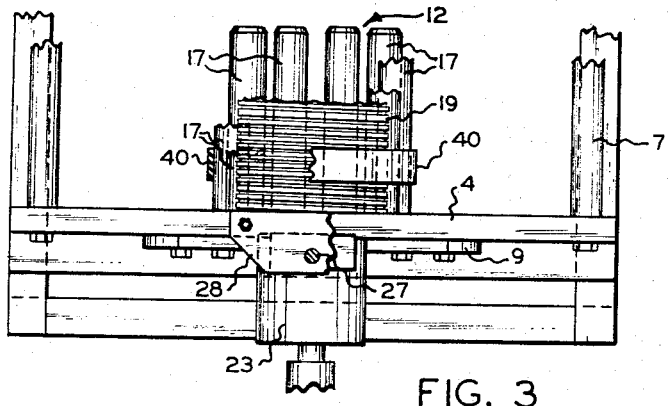
FIGURE 3 is a fragmentary, sectional view taken on the line 3—3 of FIGURE 1.
Figure 2:
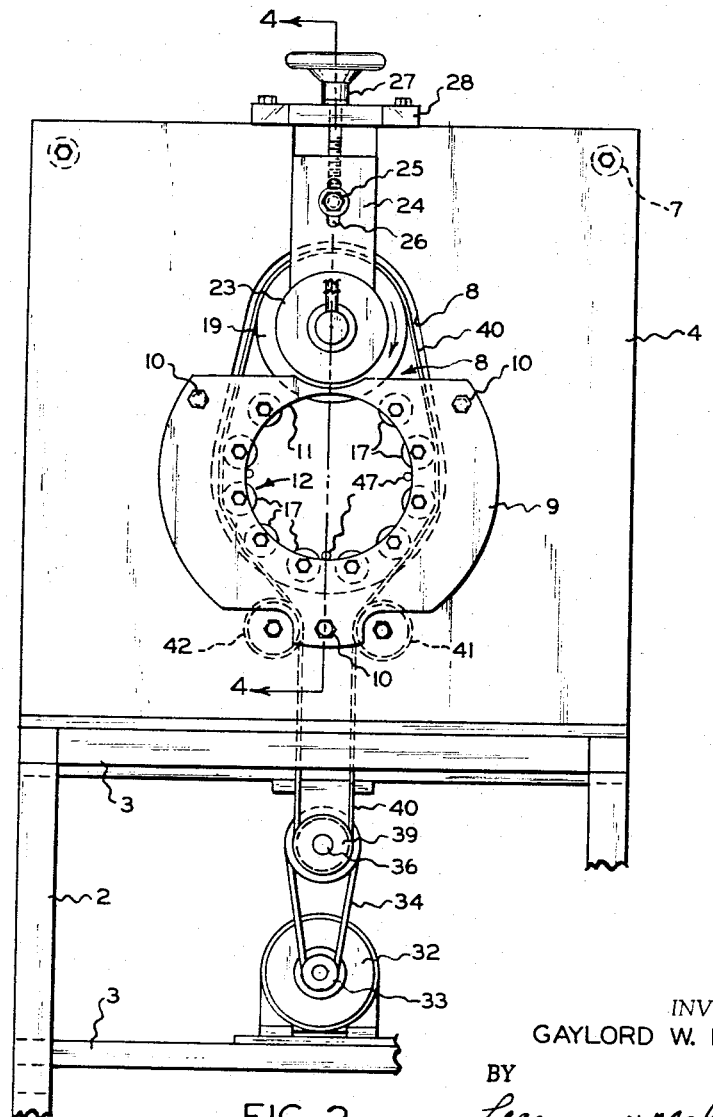
FIGURE 2 is a fragmentary, end elevational view of the apparatus.

Apparatus constructed in accordance with the invention comprises a supporting frame generally designated 1 formed of vertical and horizontal frame members 2 and 3, respectively, which are welded or otherwise suitably secured to one another. Fixed to the uppermost frame members 3 is a pair of spaced apart support plate members 4 and 5 which may be maintained in parallel relation by stringers 6 and 7. In the member 4 is a generally egg-shaped opening 8 over which lies a mounting plate 9 that is secured to the member 4 by bolts 10 or the like. The member 9 has a cylindrical opening 11 therein around which is mounted a plurality of substantially uniform, arcuately spaced, smooth surfaced crowding roll members generally designated 12 which assist in the forming operation to be described. Each roll member 12 (see FIGURE 4) is constructed in the same manner and comprises a spindle 13 having a threaded end 14 that is accommodated in an opening formed in the member 9 and which is secured to the latter by a nut 15. Rotatably journaled on the spindle 13 by suitable bearings 16 is a sleeve 17 having a polished stainless steel or chromium-plated external surface. The diameter of each sleeve 17 and its location relative to the opening 11 are such that each roll member projects radially inwardly beyond the confines of the opening 11, as is best shown in FIGURE 2. An inner race sleeve 16a is provided and, for a purpose later to be described, the end of each sleeve 17 is reduced as at 17a.

Although the roll members 12 are arranged on the arc of a circle having its center at the center of the opening 11, the rolls 12 do not form a circle. Instead, a number of rolls are omitted so that taken together the rolls that are employed present a horseshoe appearance, as viewed in FIGURE 2, for a purpose presently to be explained.

Accommodated in the opening 8 at the open end of the horseshoe configuration presented by the rolls 12 is a grooved rim curling or forming member 18 comprising a cylinder 19 having a polished, external surface in which is formed a helical groove or thread 20 which is of uniform depth except at its outer end, as will later be explained, and extends from end to end of the cylinder. The cylinder 19 is of considerably greater diameter than the roll sleeves 17. The cylinder is secured to a spindle 21 that is journaled by bearings 22 in a tubular housing 23 at one end of which is a laterally extending flange 24 which is adjustably secured to the mounting member 4 by means of a bolt 25 that passes through an elongated slot 26 formed in the flange 24. The axis of rotation of the forming member 18 lies on a plane passing through the center of the circle on which the crowding rolls 12 are arranged, and the member 18 is adjustable toward and away from the center of that circle by means of an adjusting screw 27 journaled in a bearing block 28 mounted on the member 4 and having threaded engagement with the flange 24.

It is preferred that the cylinder 19 of the forming member 18 be provided with internal coolant passage of the kind disclosed in the aforementioned copending application and that the spindle 21 be provided with coolant inlet and outlet passages which communicate with a rotatable coupling 29 that is rotatably mounted on the spindle 21 and to which are connected coolant inlet and outlet conduits 30 and 31, respectively, by means of which coolant may be circulated from a source thereof through the forming member 18 so as to maintain the external surface thereof at a predetermined temperature.

Means is provided for rotating the grooved member 18 and certain of the crowding roll members 12 and comprises an electric motor 32 having its armature shaft 33 connected by a belt 34 or the like to a pulley 35 that is fixed on a shaft 36 which is journaled in bearings 37 supported on the main frame 1. Also fixed on the shaft 36 is a driving pulley 39 around which is trained an endless drive belt 40 having transversely extending, longitudinally spaced apart, traction providing grooves which passes around the forming cylinder 19 and is in tangential engagement with a plurality of the forming rolls 12. Suitable tension is maintained on the driving belt 40 by a pair of wheels 41 and 42 journaled on the mounting member 4 between the driving pulley 39 and the forming rolls 12.

Interposed between the members 4 and 5 is an electric heating unit 42 which may be of the general type disclosed in the aforementioned application and having two semicylindrical housing sections 43 provided with arms 44 which pivotally mount the half sections on the stringers 6. Each half section 43 includes a handle operating member 45 by means of which the semicylindrical sections may be separably connected one to another to form a sleeve of such size as to accommodate a stack of nestable containers C having closed ends and generally radially extending flanges F at their open ends. Located within the heating unit 42 is a plurality of conventional electrical resistance heating elements 46 which may be connected to a source (not shown) of electrical energy. The longitudinal axis of the heating unit 42 coincides with the axis of the opening 11. Preferably, guide rods 47 extend through the heating unit so as properly to position and support the containers in the latter. Inasmuch as the rolls 12 and 18 are mounted at one end only, their free ends may be located quite close to the discharge end of the heating unit 42, thereby reducing to a large extent any tendency of the flanges F to cool prior to their introduction to the beading process.

Means is provided for forwarding or driving a stack of nested containers C through the heating unit 42 and comprises a plurality of forwarding rolls 48 formed of soft rubber or the like and journaled on spindles 49 which are inclined to the longitudinal axis of the heating unit. Each spindle 49 is journaled on a bracket 50 which is adjustably mounted in a support 51 that is secured to the mounting member 5. The supports 51 are spaced about an opening 11a formed in the plate 5, but the rolls 48 project inwardly beyond the edge of the opening so as to be capable of gripping the containers. The arrangement is such that the inclination of the axis of rotation of the rollers may be adjusted so as to control the rate at which containers are fed to the heating unit. Each spindle 49 has fixed thereto a driven pulley 52 around which is trained a drive belt 53 that is driven from a pulley 54 fast on the shaft 36.

In the operation of the apparatus, a stack of nested containers C may be presented to the feeding wheels 48 so as to enter the opening 11a base end foremost. The containers may be delivered to the feeding wheels by means of a U-shaped trough 55 or other suitable conveyor which supports the containers in such position that their flanges F will be engaged by the rolls 48 and with sufficient friction to feed the stack of containers into and through the heating unit 42 where the containers are supported by the guide rods 47. As the containers are moved through the heating unit, the flanges F of the containers will be heated and softened so as to be readily deformable. The flanges F may have axial return portions as shown herein and as described in the copending application mentioned or may terminate in radial edges as also described in the copending application. From the heating unit 42 the containers are driven forwardly by the forwarding wheels 48 to the space between the crowding rolls 12 and the forming member 18. The positions of the roll portions 17a taken together with the position of the inner surface of the leading portion 20a of the forming groove 20 are such that the rolls 17 position the flange F of each container in a manner to assure its proper entry into the forming groove 20 without undue pressure from crowding rolls 48. As is best shown in FIGURE 4, the leading portion 20a of groove 20 is of slightly greater radial depth than the remaining portion of groove 20 radially opposite the portions 17a of rolls 17. The gradual transition from the depth of groove portion 20a to the depth of the remainder of groove 20, which is in contact with a container flange at the time the flange is moving from contact with the reduced portions 17a of the rolls to the portions of the rolls 17 of greater diameter, is shown at 20b. The tapering portions 17b of rolls 17 lead from the reduced diameter portions 17a of rolls 17 to the portions of greater diameter. The remaining convolutions of the groove in a machine which is to process containers with axial return rim portions are of constant depth and some of them progressively decrease in axial width in the manner described in application Ser. No. 336,389 to curl the flange F.

Upon the introduction of the flange F of a container in the curling groove of the forming cylinder 19, the crowding rolls 12 that are driven by the belt 40 will tend to impart rotation in one direction to the container. The cylinder 19 also will be rotated by the belt 40, but in a direction opposite to the direction of rotation of the container. However, the pressure with which the crowding rolls engage the container assures rotation of the forming cylinder 19 and the container relatively to one another in opposite directions so as to advance the container axially of the forming member and simultaneously curl the flange F to form a bead or rolled edge for the open end of the container. The container stack rotates as a unitary body during its passage from the advancing rolls 48 through the machine.

Containers leaving the forming member 18 pass through the opening 11 in the plate 9 and are received on a trough 56 similar to the trough 55 or any other suitable conveyor.

In the event the radial dimension of the flange F of successive containers is smaller or greater than that of a preceding group of containers, the forming member 18 may be adjusted toward or away from the axis of the opening 11 by appropriate adjustment of the adjusting screw 27. The adjustment may be effected quite easily and quickly inasmuch as but a single forming member 18 is utilized.

The disclosed apparatus and methods are intended to be illustrative rather than definitive of the invention. The invention is defined in the claims.

What is claimed is:

1. Apparatus for curling a deformable projecting rim or flange at one end of a container comprising: means for heating the rim to a deformable state; rim curling roller means consisting of only a single rotatable grooved member having a spiral rim curling groove adapted to accommodate the rim therein and a plurality of arcuately arranged, substantially smooth surfaced crowding members circumferentially spaced about said grooved member a distance such as to engage said container and maintain the rim in said groove under such force as to effect conjoint rotation and relative axial movement of said container and said member; means mounting said grooved member for rotation about an axis; and means for rotating said grooved member.

2. The apparatus set forth in claim 1 wherein at least some of said crowding members are rotatable.

3. The apparatus set forth in claim 1 wherein all of said crowding members are rotatable; and including means for rotating and of smaller diameter than said grooved member at least some of said crowding members.

4. The apparatus set forth in claim 2 wherein the means for rotating said grooved member and the means for rotating said crowding members is the same and comprises a single drive belt trained around said grooved member and certain of said crowding members.

5. The apparatus set forth in claim 1 wherein at one end of said grooved member the leading portion of the groove is of greater depth and the ends of the crowding members opposite this portion of the groove are of reduced diameter.

6. The apparatus set forth in claim 4 in which the said ends of the crowding members taper from a portion of greater diameter to a portion of lesser diameter.

7. The apparatus set forth in claim 1 including heating means operable to heat said flange to a deformable state; and means mounting said heating means in the path of containers presented to said grooved member.

8. The apparatus set forth in claim 1 including means for effecting relative radial adjustment of said grooved member and said crowding members.

9. The apparatus set forth in claim 1 wherein said grooved member is free at one end.

10. The apparatus set forth in claim 1 wherein said crowding members are free at one end.

11. The combination defined in claim 1 in which said crowding members comprise steel rolls arranged about an axis in horseshoe formation and said grooved roll is of considerably larger diameter and fills the gap in said formation, the forming roll being mounted for radial adjustment.

12. Apparatus for forming rolled lips on plastic containers having rims and arranged in stacked relation comprising: forming means arranged on the circumference of a circle and including a rotatable forming member having a spiral groove therein proceeding from a leading end to a discharge end to accommodate the rims of the containers, at least a part of said groove comprising a forming portion; means for heating the rims of said containers to a deformable state; and means spaced from said forming means for axially crowding said containers and aiding their advance through said forming means; the leading portion of said groove being deeper than the forming portion thereof to relieve the pressure on said axial crowding means as the containers enter the forming means.

References Cited

UNITED STATES PATENTS

| | | | |
|---|---|---|---|
| 3,096,546 | 7/1963 | Edwards | 18—19 X |
| 3,192,565 | 7/1965 | Rukavina | 18—19 |
| 3,239,887 | 3/1966 | Weber | 18—19 |

J. SPENCER OVERHOLSER, *Primary Examiner.*

W. J. STEPHENSON, *Examiner.*